(12) United States Patent
Delianne et al.

(10) Patent No.: US 9,960,651 B2
(45) Date of Patent: May 1, 2018

(54) CLAW ROTOR PROVIDED WITH AN EXCITATION WINDING INSULATOR, AND ROTARY ELECTRICAL MACHINE EQUIPPED WITH THE CLAW ROTOR

(71) Applicant: VALEO EQUIPEMENTS ELECTRIQUES MOTEUR, Creteil (FR)

(72) Inventors: Henri Delianne, Maresville (FR); David Margueritte, Wailly Beaucamp (FR)

(73) Assignee: Valeo Equipements Electriques Moteur, Creteil (FR)

( * ) Notice: Subject to any disclaimer, the term of this patent is extended or adjusted under 35 U.S.C. 154(b) by 187 days.

(21) Appl. No.: 14/649,885

(22) PCT Filed: Dec. 13, 2013

(86) PCT No.: PCT/FR2013/053068
§ 371 (c)(1),
(2) Date: Jun. 4, 2015

(87) PCT Pub. No.: WO2014/096640
PCT Pub. Date: Jun. 26, 2014

(65) Prior Publication Data
US 2015/0303757 A1    Oct. 22, 2015

(30) Foreign Application Priority Data
Dec. 17, 2012  (FR) ...................................... 12 62110

(51) Int. Cl.
*H02K 1/22* (2006.01)
*H02K 1/27* (2006.01)
(Continued)

(52) U.S. Cl.
CPC ............. *H02K 3/325* (2013.01); *H02K 1/226* (2013.01); *H02K 1/27* (2013.01); *H02K 3/528* (2013.01)

(58) Field of Classification Search
CPC ............ H02K 1/226; H02K 1/27; H02K 3/32; H02K 3/52
(Continued)

(56) References Cited

U.S. PATENT DOCUMENTS

| 5,574,324 A    | * | 11/1996 | Hirama    | H02K 3/528  |
|                |   |         |           | 310/194     |
| 8,148,864 B2   | * | 4/2012  | Yoshizawa | H02K 21/044 |
|                |   |         |           | 310/156.12  |
| 8,324,782 B2   | * | 12/2012 | Minami    | H02K 21/044 |
|                |   |         |           | 310/263     |
| 9,030,073 B2   | * | 5/2015  | Leroy     | H02K 3/528  |
|                |   |         |           | 310/156.66  |
| 2003/0034708 A1| * | 2/2003  | Digby     | H02K 3/528  |
|                |   |         |           | 310/194     |

(Continued)

FOREIGN PATENT DOCUMENTS

| DE | 3008454  | 9/1980 |
| DE | 19506162 | 9/1995 |

(Continued)

*Primary Examiner* — John K Kim
(74) *Attorney, Agent, or Firm* — Berenato & White, LLC

(57) ABSTRACT

A claw rotor (2) provided with an insulator (11) for a field coil (10) and a rotary electric machine equipped with such a rotor, the insulator comprising a plurality of projecting petals (121, 131) intended to engage with the inner inclined periphery of a claw (9). Each of the petals (121, 131) includes: a base (122, 132) solidly connected to an associated cheek (120, 130), side edges (123, 133), and an end (124, 134). The claw-pole rotor (2) is wherein each petal (121, 131) has a thickness (e) at the side edges (123, 133) which increases from the base (122, 132) to the end (124, 134).

17 Claims, 9 Drawing Sheets

(51) Int. Cl.
*H02K 3/32* (2006.01)
*H02K 3/52* (2006.01)

(58) Field of Classification Search
USPC .......................................... 310/43, 194, 263
IPC .............................. H02K 1/22, 1/27, 3/32, 3/52
See application file for complete search history.

(56) References Cited

U.S. PATENT DOCUMENTS

| | | | | |
|---|---|---|---|---|
| 2003/0137208 | A1 | 7/2003 | York et al. | |
| 2011/0241471 | A1* | 10/2011 | Tokizawa | H02K 1/243 |
| | | | | 310/185 |
| 2012/0212096 | A1* | 8/2012 | Minami | H02K 21/044 |
| | | | | 310/181 |
| 2015/0303757 | A1* | 10/2015 | Delianne | H02K 3/528 |
| | | | | 310/215 |

FOREIGN PATENT DOCUMENTS

| | | |
|---|---|---|
| DE | 102011079457 | 8/2012 |
| EP | 0881752 | 12/1998 |
| EP | 0881756 | 12/1998 |
| FR | 2612349 | 9/1988 |
| FR | 2710197 | 3/1995 |
| FR | 2745445 | 8/1997 |
| JP | S6020763 | 2/1985 |
| WO | WO2006103361 | 10/2006 |
| WO | WO2008031995 | 3/2008 |

* cited by examiner

CLAW ROTOR PROVIDED WITH AN EXCITATION WINDING INSULATOR, AND ROTARY ELECTRICAL MACHINE EQUIPPED WITH THE CLAW ROTOR

CROSS-REFERENCE TO RELATED APPLCIATIONS AND CLAIMS TO PRIORITY

This application is a national stage application of International Application No. PCT/FR2013/053068 filed Dec. 13, 2013, which claims priority to French Patent Application No. 1262110 filed Dec. 17, 2012, the disclosure of which are incorporated herein by reference and to which priority is claimed.

TECHNICAL FIELD OF THE INVENTION

The present invention relates to a claw rotor provided with an excitation coil insulator, and a rotary electrical machine equipped with a rotor of this type.

PRIOR ART

Many rotary electrical machines are equipped with a claw rotor provided with an excitation winding insulator and permanent magnets.

FIG. 1 shown hereinafter illustrates a machine of this type in the form of a compact polyphase alternator, in particular for a motor vehicle. This alternator transforms mechanical energy into electrical energy, and can be reversible. A reversible alternator of this type is known as an alternator-starter, and according to another embodiment it transforms electrical energy into mechanical energy, in particular in order to start the thermal engine of the vehicle.

This alternator substantially comprises a housing 1, and, in the interior of the latter, a claw rotor 2, which is integral in rotation directly or indirectly with a shaft 3, and a stator 4, which surrounds the rotor with the presence of a small air gap. The axis X-X of the shaft 3 constitutes the axis of rotation and axial symmetry of the rotary electrical machine, and thus the axis of the rotor 2. Hereinafter in the description, the orientations radial, transverse and axial are to be considered relative to this axis X-X.

The stator 4 comprises a body in the form of a set of plates provided with notches, in this case of the semi-closed type, equipped with notch insulators for fitting of the phases of the stator, each comprising at least one coil which passes through the notches in the body of the stator, and forms a chignon 5 on both sides of the stator body.

The coils are obtained for example from a continuous wire covered with enamel, or from conductive elements in the form of a bar, such as pins which are connected to one another for example by welding.

These coils are for example three-phase coils connected in the form of a star or a triangle, the outputs of which are connected to at least one rectifier bridge comprising rectifier elements such as diodes or transistors of the MOSFET type, particularly when an alternator-starter is involved, as described for example in document FR 2 745 445 (U.S. Pat. No. 6,002,219).

The number of phases depends on the applications, and can be more than three, with one or two rectifier bridges being able to be provided as in document EP 0 881 752.

The claw rotor 2 (FIGS. 1 and 2) comprises two magnet wheels 7, 8, which are juxtaposed axially and have an annular form. Each wheel 7, 8 has a flange with transverse orientation which is provided on its outer periphery with claws 9 which have a trapezoidal form and an axial orientation. The claws 9 of one wheel face axially towards the flange of the other wheel, with the claw of one magnet wheel 7, 8 penetrating into the space which exists between two adjacent claws 9 of the other magnet wheel 8, 7, such that the claws of the magnet wheels are imbricated. The claws 9 are axially in the form of teeth with a globally trapezoidal form.

Thus, the outer periphery of the claws 9 has an axial orientation, and defines with the inner periphery of the stator body the air gap between the stator 4 and the rotor 2. The inner periphery of the claws 9 is inclined. These clause 9 are less thick at their free end.

The flanges of the wheels 7, 8 have an annular form, and have on their outer periphery (FIG. 2) radial projections 19 which are connected by chamfers 119 to the claws 9. These projections 19 belong to the claws 9, and constitutes areas of rooting of the claws on the flanges 7, 8. The number of claws, and thus of projections, depends on the applications, and in particular on the number of phases of the stator. In FIG. 2, eight claws per magnet wheel are provided. As a variant, each wheel 7, 8 comprises six or seven claws. It will be noted that the space between two consecutive projections 19 is globally in the form of a "V". This space widens in the direction of the outer periphery of the claws. The claws 9 have a thickness which decreases going axially from a projection 19 of a claw 9 to the thinner free end of this claw 9. The claws 9 are circumferentially narrower at their free end than at their projection 19 for rooting on the flange concerned.

A cylindrical core is interposed axially between the flanges of the wheels 7, 8. In this case, this core consists of two half-cores which each belonged to one of the flanges. As a variant, the core is in a single piece, and is interposed axially between the flanges 7, 8. This core has a cylindrical form.

This core bears on its outer periphery and excitation winding 10 which is wound in an insulator 11 interposed radially between the core and this winding 10.

This insulator 11 supports the winding 10. It can be seen in document EP 0881 752 (FIG. 1), and is described for example in document FR 2 612 349.

It is made of electrically insulating and mouldable material, such as plastic material, whereas the magnet wheels 7, 8 and the core are made of metal, and in this case are made of ferromagnetic material, such as mild steel. The shaft 3 is also made of metal, and is made of ferromagnetic material, such as steel which is harder than the magnet wheels and the core of the claw rotor.

The insulator 11 which is illustrated in FIG. 3 is in the form of a coil. It comprises a tubular hub 110 with axial orientation, at the ends of which there are provided two annular cheeks 120, 130 which are perpendicular to the hub. The hub 110 is fitted on the core of the rotor 2. The inner periphery of the hub is in close contact with the outer periphery of the core. The cheeks 120, 130 with transverse orientation are adjacent to the projections 19 of the flanges respectively of the wheel 8 and the wheel 7. Slight axial play exists between the cheeks of the insulator 11 and the flanges, in order to arrange the winding 10. As a variant, the cheeks are in contact with the projections. The size of the cheeks depends on the height of the projections 19 and of the winding 10, and thus on the number of turns of this winding. The cheeks are configured to come into contact with the inner periphery of the claws 9, in a manner described hereinafter.

The hub 110 makes it possible to insulate the winding 10 electrically relative to the core of the rotor 2, whereas the cheeks 120, 130 make it possible to insulate the winding 10 electrically relative to the flanges of the magnet wheels 7, 8.

The outer periphery of each cheek 120, 130 comprises a plurality of petals 121, 131, which project respectively, and are wider circumferentially than the base of the claws (see FIGS. 3 and 4). One of the cheeks has means for connection of the ends of the electrically conductive wire wound in the insulator 11, as can be seen in FIGS. 3, 6 and 8 of this document FR 2 612 349. The petals are deployed and have a globally radial orientation in the free state, i.e. before fitting of the insulator 11 between the flanges of the wheels 7, 8. They are slightly inclined axially in the free state as can also be seen in FIG. 2 of document US 2003/0137208 according to the preamble of claim 1.

Each of the petals 121, 131 has a base which is integral with the cheek 120, 130 of the lateral edges and an end. These petals 121, 131 are folded back during the fitting of the insulator on the core of the rotor 2, in order to cooperate with the inner periphery of the claws 9 of the magnet wheels, in order to insulate the winding 10 electrically relative to the claws 9 and to the projections 19. According to one embodiment, thanks to the petals, the winding 10 can have a shape in the form of a barrel, as represented in broken lines in FIG. 1.

The housing 1 bears the stator 4 on the interior of its outer periphery, and bears the shaft 3 centrally in rotation. In this case, this housing comprises two perforated flanges 16, 17 which are known as the front bearing and the rear bearing. The front bearing 16 is adjacent to a pulley 12, whereas the rear bearing 17 supports the brush-holder, the voltage regulator and at least one rectifier bridge. The bearings have a hollow form, and each support centrally a ball bearing respectively 18 and 20 for fitting in rotation of the shaft 3 of the rotor 2. The diameter of the bearing 18 is larger than that of the bearing 20.

The pulley 12 is secured on the front end of the shaft 3, in this case by means of a nut 160 which is supported on the base of the cavity of this pulley 12. This pulley 12 comprises a bush which is in contact with the inner ring of the bearing 18. An annular brace 159 is interposed axially between the frontal face of the front magnet wheel 7 and the inner ring of the bearing 18. The shaft 3 passes through the brace 159 and the bush of the pulley 12.

In FIG. 1, the outer periphery of the body of the stator 4 is provided with a resilient system for filtering of the vibrations, with a flat seal 40 at the front and buffers 41 at the rear, flexible and thermally conductive resin being interposed between the front bearing and the body of the stator in order to discharge the heat. As a variant, the bearings 16, 17 support the body of the stator 4 rigidly without the presence of the seal 40 and the buffers 41.

The alternator in FIG. 1 is an alternator with internal ventilation, which, as in document EP 0 881 752, comprises front 16 and rear 17 bearings, with air intake and air output openings in order to permit the cooling of the alternator by circulation of air generated by the rotation of at least one internal fan which is integral with one of the axial ends of the rotor 2. In this case, a fan 23 is provided on the front frontal face of the rotor, and another fan 24, which in this case is more powerful, and is obtained by the superimposition of two elementary fans with blades which are offset circumferentially, is provided on the rear dorsal face of the rotor, each fan being provided with a plurality of blades 25, 26.

As a variant, the alternator comprises an external fan adjacent to the pulley, as in document DE 30 08 454. As a variant, the alternator is cooled by circulation of a fluid, such as the water for cooling the thermal engine of the vehicle, which circulates in a channel provided in the housing 16, 17.

The front end of the shaft 3 supports the pulley 12 which belongs to a device for transmission of movement to at least one belt between the alternator and the thermal engine of the motor vehicle, whereas the rear end 13 with a reduced diameter of the shaft 3 supports collector rings which are connected by means of wired connections to the ends of the winding 10. In this case, the wired connections and the collector rings belong to a collector of the type described in document FR 2 710 197. Brushes belonging to a brush-holder 14 are arranged such as to rub on the collector rings. The brush-holder is connected to a voltage regulator.

When the excitation winding 10 is supplied electrically by the brushes, the rotor 2 is magnetised and becomes an inductor rotor, with formation of magnetic north-south poles at the claws.

This inductor rotor 10 creates an alternating induced current in the induced stator when the shaft 3 is rotating, with the rectifier bridge(s) making it possible to transform the induced alternating current into a direct current, in particular in order to supply the charges and the consumers of the on-board network of the motor vehicle, as well as to recharge the battery of the said vehicle.

The performance, i.e. the power and the output, of the rotary electrical machine can be increased further by using a claw rotor with the configuration according to FIG. 2. This rotor can comprise permanent magnets 38 which are arranged symmetrically relative to the axis X-X of the rotor, and are interposed between two adjacent claws 9 on the outer periphery of the rotor. These magnets 38 are known as interpolar magnets, since they intervene between two consecutive claws which belong to one and the other of the magnet wheels.

FIG. 2 shows four pairs of magnets 38 for eight pairs of poles. As a variant, the number of magnets is equal to the number of pairs of poles.

A magnet of this type is represented in FIG. 1, and can also be seen in FIG. 1 of document EP 0881 752.

The shaft 3 is rendered integral with the wheels 7, 8 directly in FIG. 1 by forcing harder projecting knurled portions of the shaft 3 into the inner bores in the wheels 7, 8. The shaft 3 also has a smooth intermediate portion between the two knurled portions. One of the knurled portions is also used for securing of the brace 159. The half-cores of the wheels 7, 8 are pressed against one another for good passage of the magnetic flux.

In other documents, the shaft is fitted by deformation and creeping of material.

For example in document DE 300 84 54 (FIG. 4) the shaft has two grooves with a base with axial striations. The material of the flanges of the magnet wheels is deformed in order to flow into the striations of the grooves.

In document WO 2008/031995, the same applies, but constructive measures have been taken in order to facilitate the machining, arrange the areas for fitting of the bearings 18, 20, and reduce the diameter of the rear end of the shaft 3.

In FIGS. 1 to 7 of document DE 300 84 54, the core of the rotor is in a single piece interposed axially between the two flanges of the magnet wheels, whereas in document WO 2008/031995, the core is in two parts, and the striations are longer.

According to another embodiment described in document WO 2006/103361, the magnet wheels are fitted indirectly on the shaft by means of an intermediate sleeve or a shouldered core provided with bearing surfaces for fitting of the flanges of these wheels. At least one knurled section of the shaft is forced into the inner bore in the intermediate sleeve or the shouldered core, then the wheels are secured respectively on the sleeve or the flanges of the wheels on the core, for example (FIGS. 3 and 5 of this document) by welding or crimping.

In document FR 2 612 349, in a first step, one of the first magnet wheels is fitted onto the shaft, then in a second step, the insulator equipped with its excitation winding is fitted on the half-core, and finally, in a third step, the second magnet wheel is fitted onto the knurled portion of the shaft.

The insulator with its winding is fitted on the half-cores-of the magnet wheels, then, after angular positioning of the two wheels, for example by means of fingers interposed temporarily between the projections of the magnet wheel concerned, by means of a compacting press the half-cores are pressed against one another for good passage of the magnetic flux. The shaft is then fitted into the central bores in the magnet wheels without destruction of the angular positioning of the magnet wheels, and finally, by means of a tool, the material of the magnet wheels is deformed for penetration into the areas of crimping with striations of the shaft.

If the rotor is equipped with interpolar magnets, the magnets are fitted into a groove which does or does not open out, of a first magnet wheel, then the second magnet wheel is brought into the correct angular position, in the knowledge that this wheel can be turned without difficulty. During this step, the second magnet wheel is brought closer axially to the first magnet wheel.

More specifically, via their inclined inner periphery, the ends of the claws of the second magnet wheel are brought progressively into contact with the petals of the cheek associated with the second wheel, in order to turn down, and thus fold back the petals of this cheek.

A short-circuit may occur between the copper of the excitation winding and one of the claws, both during the compacting step and in use. When the claw rotors are used in an alternator for a motor vehicle, short-circuits of this type have the consequence in particular of no longer permitting normal charging of the vehicle battery.

In addition, the winding is generally supported on the insulator 11 whilst having a shape in the form of a barrel. "Form of a barrel" means more specifically the fact that the outer diameter of a part of the excitation winding, taken at the center of the winding in the axial direction, is larger than the outer diameter of the other parts of the said winding, taken at its ends in the axial direction, these ends being in contact with the annular cheeks 120, 130 when the winding is fitted on the insulator 11.

In a configuration of this type of the winding with a shape in the form of a barrel, the probability of short-circuits is then increased.

In addition, in the case when the claw rotor comprises interpolar magnets, similar short-circuits can also occur because of the contact of the winding with at least one of the magnets.

There is therefore a real need to find alternatives to devices of this type, which make it possible to solve this technical problem associated with the problems of insulation of the excitation winding.

SUMMARY OF THE INVENTION

The objective of the invention is to eliminate all or some of the disadvantages of the prior art, in particular the problem of insulation of the excitation winding.

According to a first aspect, the invention relates to a claw rotor, in particular for an alternator or an alternator-starter of a motor vehicle, comprising an axis of axial symmetry, two magnet wheels each comprising a flange which supports projections extended by claws with axial orientation which face towards the flange of the other magnet wheel, a core interposed between the flange of the magnet wheels, and an insulator of an excitation winding fitted on the core, wherein the insulator comprises a hub which is fitted on the core, and a cheek at each of the ends of the hub, each cheek supporting a plurality of projecting petals which are designed to cooperate with the inclined inner periphery of a claw, each of the petals having a base which is integral with the cheek, lateral edges and an end, the claw rotor being characterised in that each petal has a thickness at the lateral edges which increases from the base to the end.

Thanks to the invention, a safety distance is ensured between the claws which form poles and the winding when the said winding has a shape in the form of a barrel, in particular at the central part of the winding where risks of short-circuits are greater in this shape in the form of a barrel.

With the thickness of the petal being gradually increased, a distance between the copper of the winding and the iron of the claw is ensured, consequently limiting the risk of short-circuits, both during the fitting of the claw rotor and during its use.

In addition, the fitting of the insulator which supports the winding with the magnet wheels is facilitated and made secure. In fact, during this fitting and during the compacting operation, a certain distance is maintained between the winding and the poles, thus ensuring the absence of short-circuits during this step.

According to a particular characteristic, the thickness of each of the petals increases from the base to the end at any radial cross-section of the said petal. In this case, not only the lateral edges but also the component part of the petals between these two lateral edges have a thickness which increases from the base to the end, thus making it possible to improve the resistance of the petals, whilst ensuring an improved insulation function.

According to another characteristic, the increase in the thickness is continuous or progressive. According to one embodiment, this increase can be continuous on one portion of the petal, and progressive on another portion.

The configuration in which the increase of the thickness is progressive is particularly suitable for a form of the winding in the shape of a barrel.

In fact, generally in this form in the shape of a barrel, the outer diameter of one of the parts of the winding taken at one of its ends develops progressively towards the part of the winding taken at its center. When the increase in the thickness is progressive, this makes it possible to ensure better insulation.

In addition, in a configuration of this type, it is possible to increase the number of turns of the excitation winding, whilst guaranteeing good protection at the foot of the petal, without risk of short-circuit.

According to one characteristic, the thickness of a petal at its base is contained between the thickness of the cheek and the thickness plus 10% of the associated cheek.

According to a technical characteristic, the increase in the thickness between the base and the free end of each of the petals is contained between 10% and 50% of the thickness of the cheek. These dimensions make it possible to prevent in an optimum manner any risk of short-circuits.

Also advantageously:
the thickness of each of the petals at the base is contained between 0.45 and 0.8 mm; and/or
the thickness of each of the petals at its free end is contained between 1 and 1.2 mm.

These dimensions, taken independently or together, make it possible both to insulate the winding in an improved manner, and ensure that the petal has sufficient resistance when it is folded back during the compacting operation.

According to another embodiment, the thickness of the base of each of the petals is equal to the thickness of the cheek. In particular, this makes it possible to avoid each of the petals being weakened when it is bent.

According to another technical characteristic, the claw rotor comprises at least one permanent magnet which is fitted between two adjacent claws belonging to each of the magnet wheels. In a configuration of this type, the petals have some or all of the aforementioned characteristics, thus making it possible to ensure the insulation of the winding with the magnets in addition to the poles constituted by the claws.

The invention also makes it possible to insulate the excitation winding against the magnet.

According to another aspect, the invention also relates to a rotary electrical machine, characterised in that it is equipped with a claw rotor comprising some or all of the above-described characteristics.

BRIEF DESCRIPTION OF THE FIGURES

Other characteristics and advantages of the invention will become apparent from reading the following description, with reference to the accompanying figures, which illustrate.

For the sake of greater clarity, elements which are identical or similar are indicated by identical reference signs in all of the figures. In the aforementioned manner, the orientations radial, transverse and axial are to be considered relative to the axis X-X in FIG. 1.

DETAILED DESCRIPTION OF AN EMBODIMENT

Figure 1:
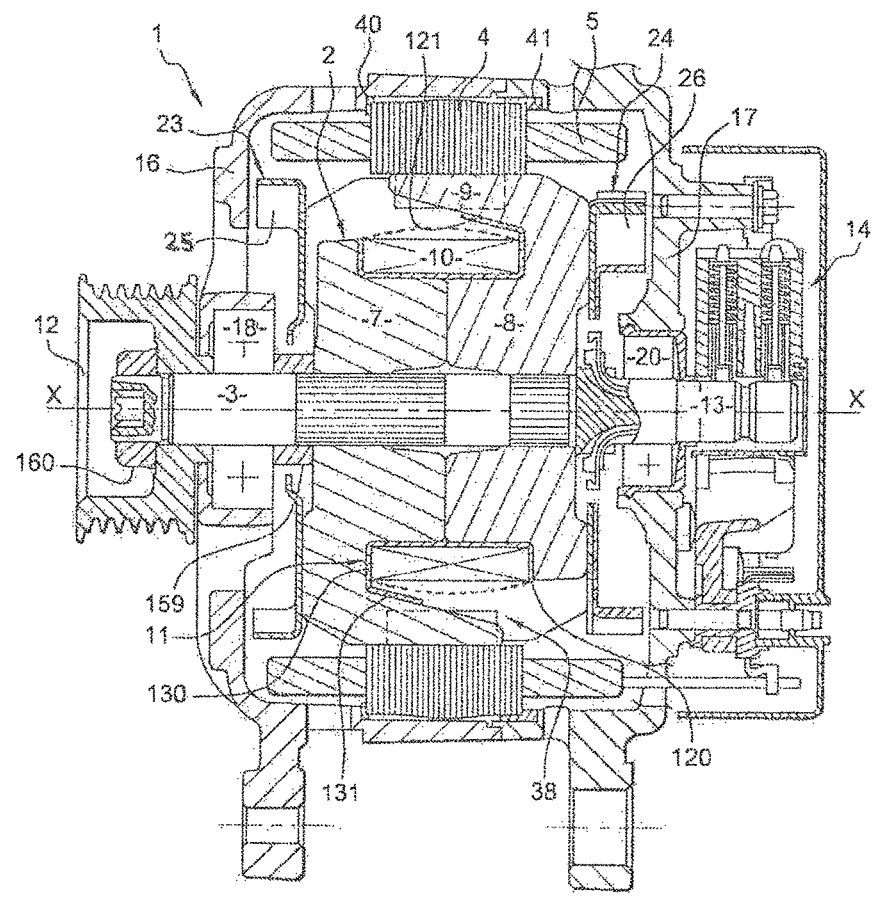
FIG. 1 is a view in axial cross-section of a rotary electrical machine according to the prior art.
Figure 2:
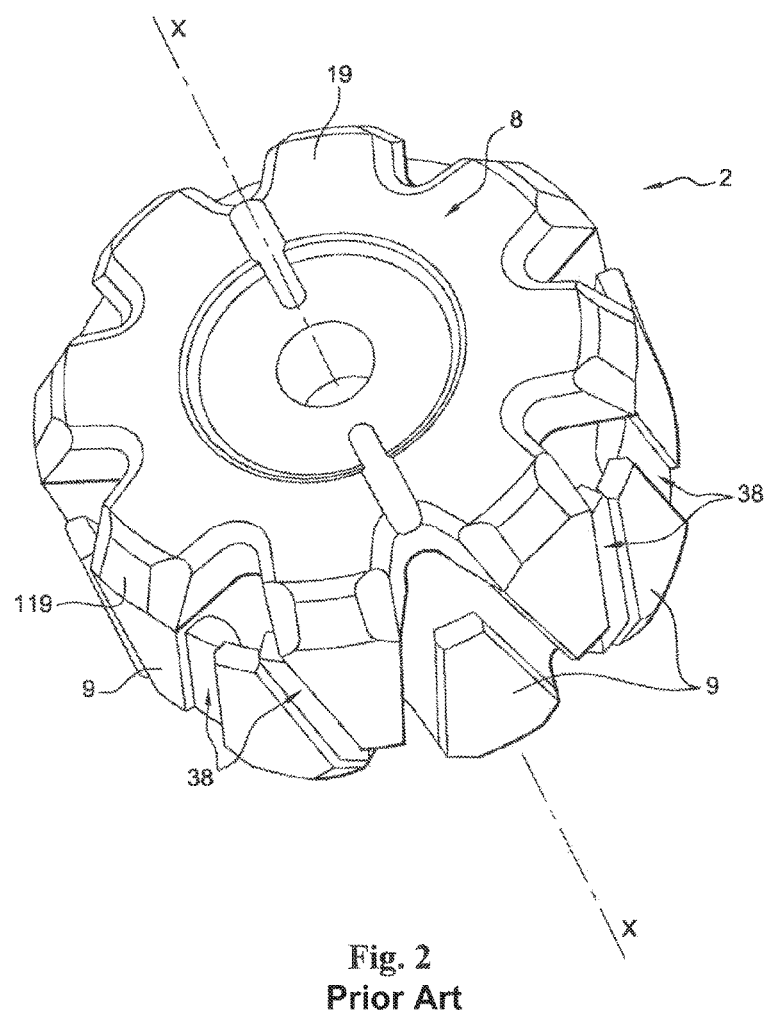
FIG. 2 is a view in perspective of the claw rotor in FIG. 1 equipped with permanent magnets in order to increase the power of the machine.
Figure 3:
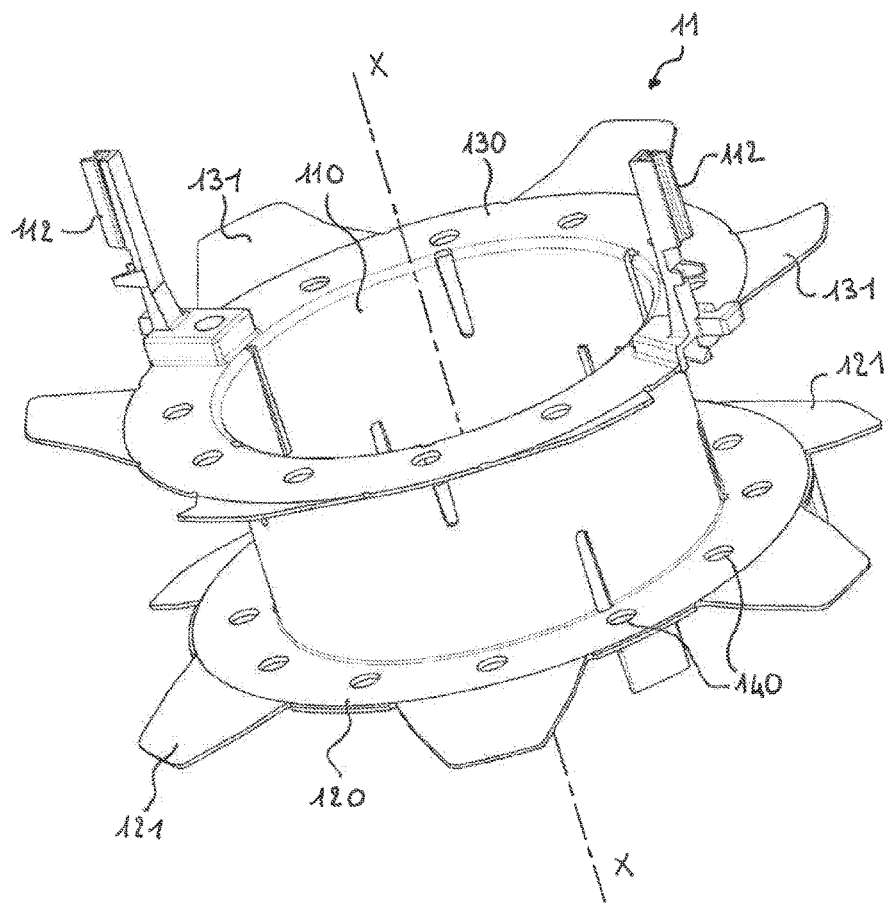
FIG. 3 is a view in perspective of the insulator according to the prior art designed to support the winding.
Figure 4:
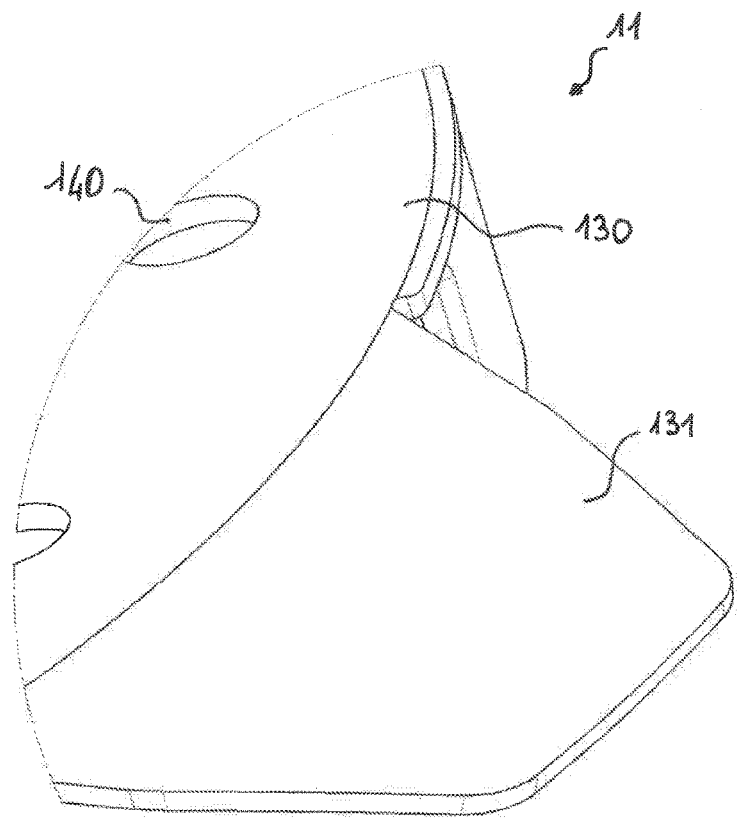
FIG. 4 is a view in perspective of a petal projecting from a cheek of the insulator in FIG. 3.
Figure 5:
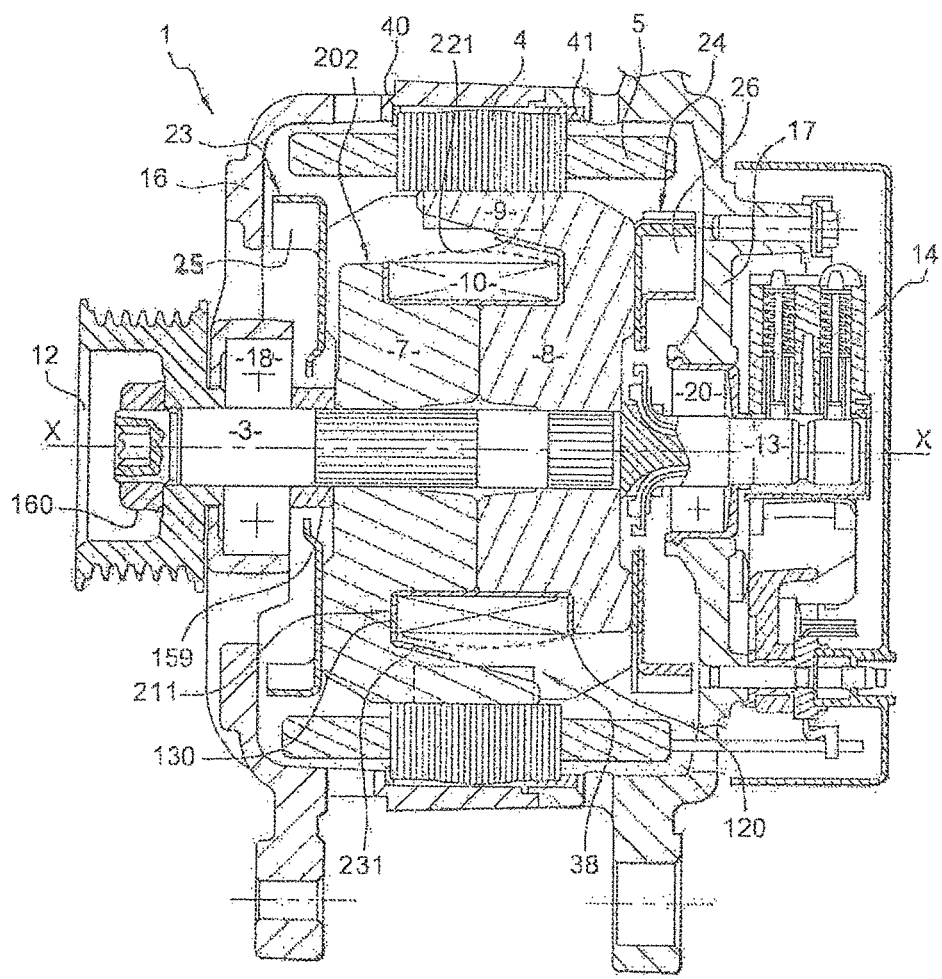
FIG. 5 is a view in axial cross-section of a rotary electrical machine according to an invention.

The electrical rotary machine of FIG. 1 according to the prior art corresponds substantially to the electrical rotary machine of the present invention of FIG. 5, and an insulator 211, which differs, will therefore be explained in detail below. In FIGS. 5 to 8, the insulator 211 has the same structure as the insulator 11 according to the prior art, i.e. it is made of electrically insulating material, in this case plastic material, and is in the form of a coil with a cylindrical sleeve 110 with axial orientation, which is provided at each of its axial ends with a cheek 120, 130 with transverse orientation, as in FIG. 1. The alternator or the alternator-starter of the invention is, as noted above, of the type indicated in the prior art.

The sleeve 110 of the insulator 211 is thus fitted centered on the cylindrical core of a claw rotor 202, whereas the cheeks 120, 130 are each designed to be adjacent to, or even to come into contact with, one of the flanges of a magnet wheel.

Preferably slight fitting play exists between the cheeks and the flanges of the wheels.

The winding 10 is wound in this insulator 211 which acts as a support for this winding. In particular, it is supported by the tubular hub 110 with axial orientation, at the ends of which there are provided two annular cheeks 120, 130 which are perpendicular to the hub, with the annular cheeks bordering the winding laterally.

Figure 6:
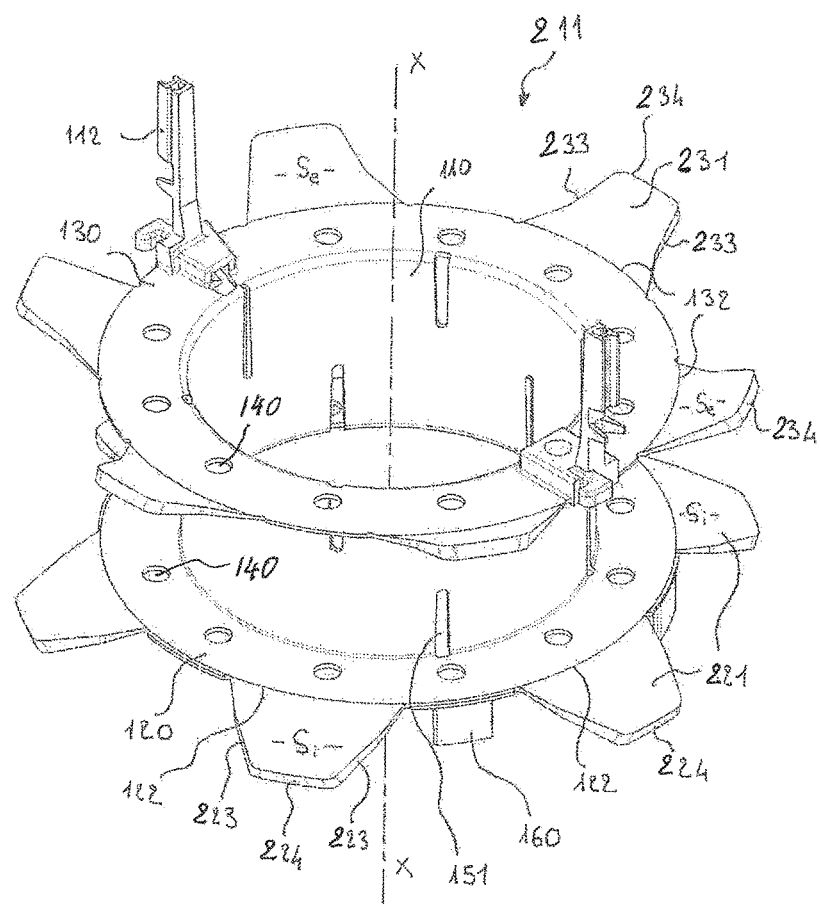
FIG. 6 is a view in perspective of an insulator according to the invention, which is designed to support the winding.

In FIG. 6, the cheeks 120 and 130 each have a plurality of holes 140, whereas the sleeve 110 has a plurality of blind slots 151 which are offset circumferentially for securing, for example by means of resin or another adhesive, respectively of the cheeks 120, 130 on the flange and on the half-core of the planet wheels 8, 7 concerned.

Projections 160 with axial orientation belong to the cheek 130, these projections being designed to cooperate with the base of two adjacent projections 19 of the front magnet wheel 7, for blocking in rotation of the insulator 211.

It will be appreciated that this blocking in rotation is carried out as a variant as in document FR 2 612 349, with the inner periphery of the hub 110 and the outer periphery of the half-cores of the rotor 2 having a polygonal form.

In addition, two lugs 112 with axial orientation are provided on the cheek 130, these lugs being designed to ensure the insulation and retention of the wire of the winding so that the latter is not in contact with the poles.

In the present embodiment, the inner periphery of the hub 110 and the outer periphery of the half-cores of the rotor 202 have a circular form.

Each cheek 120, 130 has projecting petals 221, 231 which, in the initial state, i.e. in the free state, are deployed and have globally radial orientation. These petals are inclined slightly axially, initially in the direction of the magnet wheel concerned.

The petals 221, 231 are designed to be turned back and folded in order each to come into contact with the inner periphery of a tooth 9 of the rotor 202. The circumferential width at the base of a petal is greater than the circumferential width of the adjacent projection 19.

According to the invention, the petals with a globally trapezoidal form are modified in the manner described hereinafter, in FIGS. 5 to 8.

Each of the petals 221, 231 has:
a base 122, 132 which is integral with the associated cheek 120, 130;
lateral edges 223, 233; and
a free end 224, 234.

Figure 7:
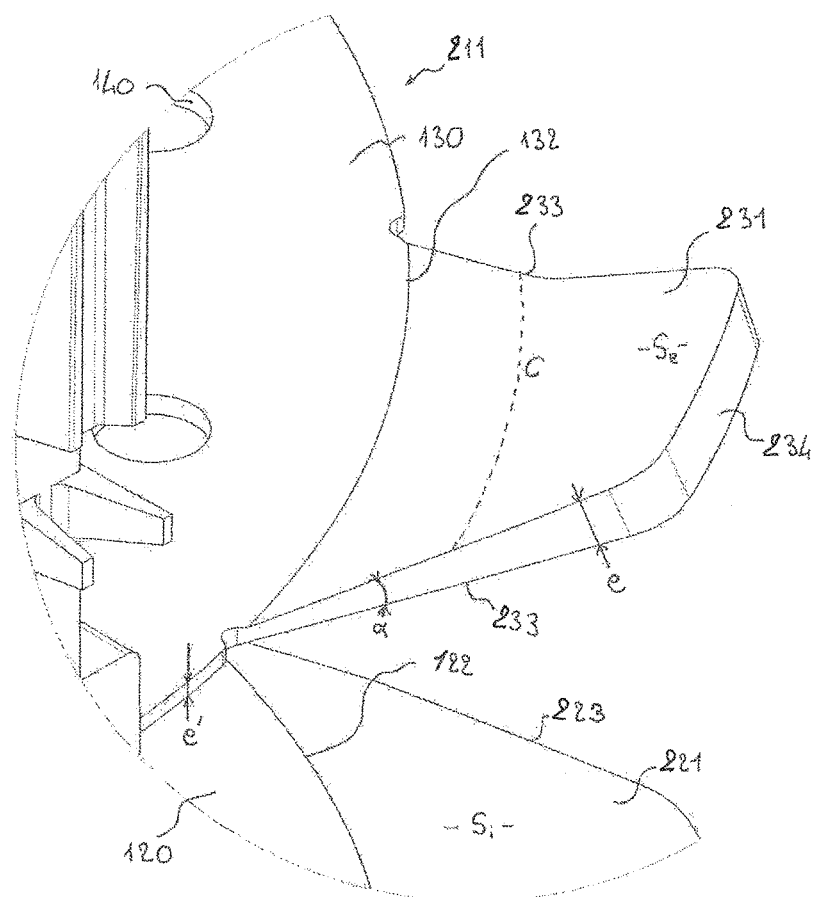
FIG. 7 is a view in perspective of a petal according to an embodiment of the invention.
Figure 8:
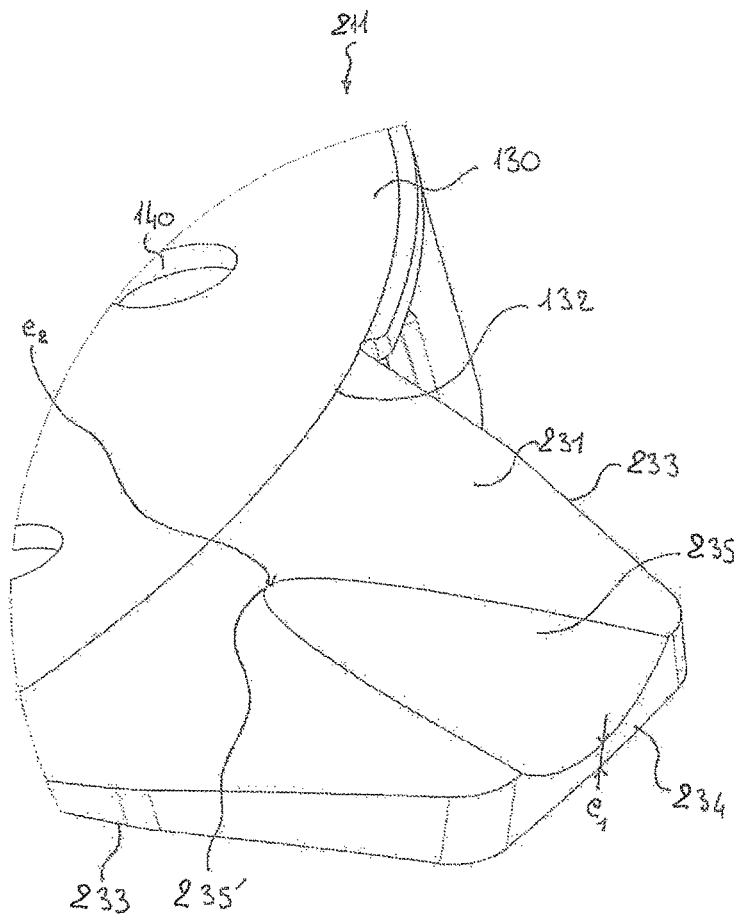
FIG. 8 is a view in perspective of a petal according to a second embodiment of the invention.

In addition, each petal 221, 231 has a thickness e at the lateral edges 223, 233 which increases from the base 122, 132 to the end 224, 234 (FIGS. 6-8).

According to one embodiment (FIGS. 6 and 7), the thickness of the petals increases continuously from the base to the end at any point of its surface.

The petals 221, 231 each have a thickness e at the lateral edges which is delimited by two surfaces, i.e. an inner surface Si and an outer surface Se.

The inner surface Si is the one which, once the petal 221, 231 has been folded back, will face the winding 10. The surface Se is the one which, once the petal 221, 231 has been folded back, will face the claws 9.

In this embodiment, the inner Si and outer Se surfaces are flat, and form between one another an angle α which is contained between 0 and 10°. A constant angle α in this case characterizes the continuous increase of the thickness e at the lateral edges 233, which increases from the base 132 to the end 234.

Figure 9:
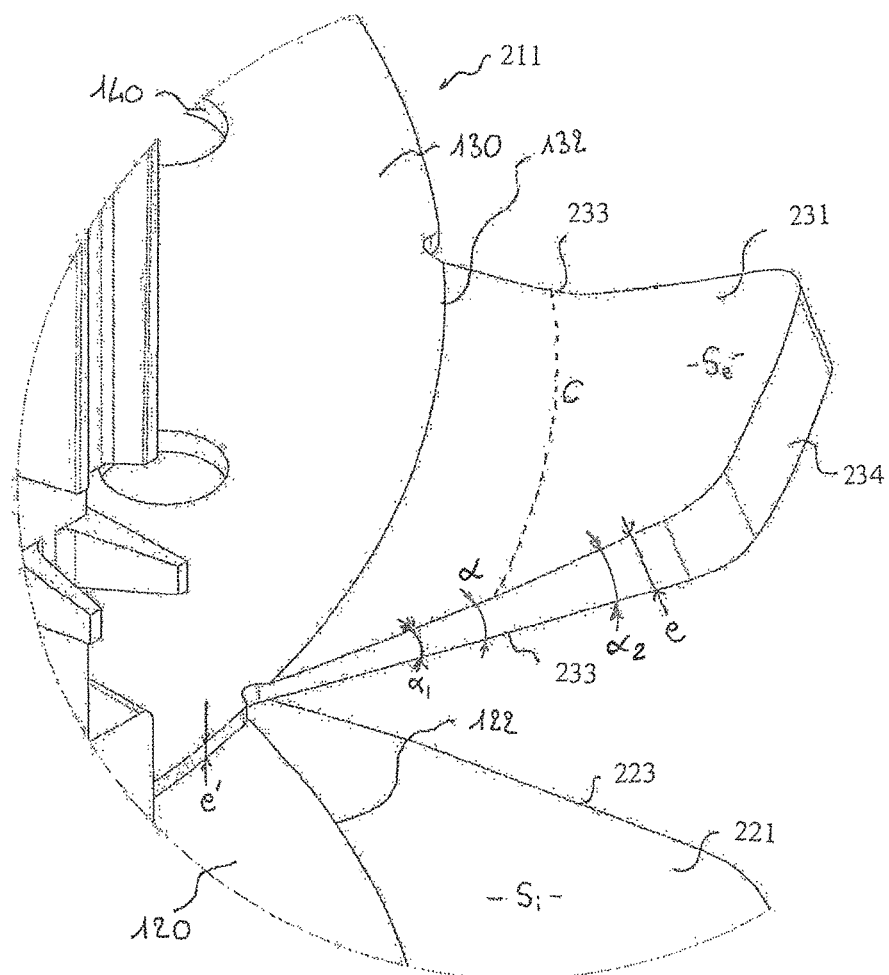
FIG. 9 is a view in axial cross-section of a rotary electrical machine according to another embodiment of the invention.

According to another embodiment shown in FIG. 9, the angle α can vary in an increasing manner according to its distance from the base 122, 132 towards the end 124, 134 of the petal 221, 231. In this case, the increase of the thickness e at the lateral edges 233 increases progressively from the base 122, 132 towards the end 224, 234. Specially, as shown in FIG. 9, the angle $\alpha_2$ is larger than the angle $\alpha_1$.

In this case, the angle formed between the inner Si and outer Se surfaces of a petal is the same irrespective of the radial cross-section of the petal. In other words, the thickness of a petal is constant at any point of an arc of a circle C which is concentric relative to the circular periphery of the cheek with which it is associated (see FIG. 7).

The thickness e of a petal 221, 231 at the base 122, 132 is contained between the thickness e' of the cheek 120, 130 and the thickness e' plus 10% of the associated cheek 120, 130, and the thickness e of its lateral edges taken at its end 224, 234 is increased, this increase being contained, according to the applications and the form in the shape of a barrel of the winding 10, between 10% and 50% of the thickness e'.

It will be remembered that alternators for a motor vehicle have a stator outer diameter contained between 110 and 150 mm and a claw rotor outer diameter contained between 78 and 112 mm. The length of the stator body is contained between 26 and 42 mm. For good power of the alternator, this stator body has a length greater than that of the core of the claw rotor. For alternators with lower power, the length of the core of the rotor is greater than that of the stator body. The ratio of the outer diameter of the core relative to the outer diameter of the rotor is contained between 0.5 and 0.6. The thickness of the flanges of the wheels 7, 8 is less than half the length of the core of the rotor. The thickness of the claws 9 at their end for connection to the projections 19 is globally equal to the thickness of the flanges of the wheels 7, 8. For further details, reference will be made for example to document EP 0 881 756. It is apparent from the foregoing information that the thickness of the cheeks 120, 130 is as small as possible, in order to obtain a winding 10 with the longest length possible. The thickness of the cheeks 120, 130 is thus preferably less than 1 mm, for example a maximum equal to 0.8 mm. Thus, according to one embodiment, the thickness of a petal 221, 231 at its end 224, 234 can be 1 to 1.2 mm, in the knowledge that a minimum thickness is required in order to be able to bend the petals 221, 231.

According to a second embodiment (FIG. 8), the thickness of the petals at the lateral edges increases continuously from the base to the end. Nevertheless, this embodiment differs from the previous embodiment in particular in that the outer surface Se of the petals comprises a recess 235. In this case, the thickness of the petals does not increase from the base to the end at all radial cross-sections of the said petal. In fact, for a radial cross-section which is localized at the recess 235, in this case the thickness increases and then decreases from the base to the end.

Preferably, and as illustrated in this figure, the recess is situated in the middle of the petal, i.e. it is centered relative to the two lateral edges 223, 233.

A recess of this type involves a decrease in the thickness of the petal which permits a decrease in the quantity of material used for its production, whilst providing improved insulation. In this case in particular, a thickness e1 of the petal taken at its end 234 and at the center of the petal, in this case at the recess 235, is strictly less than the thickness e of the lateral edge of the petal on its end side.

In general, an area 235' of the recess 235 which is closest to the base 132 of the petal 231 has a thickness e2 greater than, or equal to, the thickness of the base of the petal. This makes it possible for the recess not to weaken the petal.

A characteristic of this type, associated with the increase in the thickness of the petals at the lateral edges, makes it possible both to improve the insulation of the excitation winding, and reduce the production cost and the weight.

Preferably, and as illustrated here, this recess is localized towards the end 224, 234. This also makes it possible not to weaken the petal, and in particular not to risk damaging the insulator 11 during the folding of the petals.

In addition, each of these embodiments also makes it possible to insulate the winding securely when the rotor is equipped with interpolar magnets 38. There is no longer any risk of short-circuits when the magnet wheels are secured on the insulator which supports the excitation winding, in particular when the second magnet wheel is brought axially towards the first magnet wheel.

It is apparent from the foregoing information that the petals 221, 231 are advantageously wider at least at their base than the axial claws 9.

The invention is described in the foregoing information by way of example. It will be appreciated that persons skilled in the art will be able to produce different variant embodiments of the invention, without departing from the context of the invention.

Thus, as a variant, the outer periphery of the hub is not cylindrical, for example it has a polygonal form. The same applies to the complementary inner periphery of the sleeve of the insulator.

The invention claimed is:

1. A claw rotor (202) for an electrical rotary machine having an axis of axial symmetry (X-X), comprising:
   two magnet wheels (7, 8) each comprising claws (9) and a flange supporting projections (19) extended by the claws (9) with axial orientation facing towards the flange of the other magnet wheel (8, 7);
   a core interposed between the flanges of the magnet wheels (7, 8); and
   an insulator (211) of an excitation winding (10) fitted on the core;
   the insulator (211) comprising a hub (110) fitted on the core, and a cheek (130, 120) at each of the ends of the hub (110),
   each cheek (120, 130) supporting a plurality of projecting petals (221, 231) which cooperate with the inclined inner periphery of the claw (9),
   each of the petals (221, 231) having a base (122, 132) which is integral with the cheek (120, 130), lateral edges (223, 233) and a free end (224, 234),
   each petal (221, 231) of the claw rotor (202) having a thickness (e) at the lateral edges (223, 233) which increases continuously from the base (122, 132) to the free end (224, 234).

2. The claw rotor according to claim 1, wherein the increase in the thickness (e) is progressive.

3. The claw rotor according to claim 1, wherein the increase in the thickness (e) between the base (122, 132) and the free end (224, 234) of each of the petals (221, 231) is between 10% and 50% of the thickness (e') of the cheek.

4. The claw rotor according to claim 1, wherein the thickness (e) at the base (122, 132) of each of the petals (221, 231) is equal to the thickness (e') of the cheek (120, 130).

5. The claw rotor according to claim 1, wherein the thickness (e) at the base (122, 132) of each of the petals (221, 231) is equal to the thickness (e') of the cheek (120, 130) plus 10%.

6. The claw rotor according to claim 1, further comprising at least one permanent magnet (38) which is fitted between two adjacent claws (9) belonging to one of the magnet wheels (7, 8).

7. A rotary electrical machine, wherein the machine is equipped with a claw rotor (2) according to claim 1.

8. The claw rotor according to claim 1, wherein the increase in the thickness (e) between the base (122, 132) and the free end (224, 234) of each of the petals (221, 231) is between 10% and 50% of the thickness (e') of the cheek (120, 130).

9. The claw rotor according to claim 2, wherein the increase in the thickness (e) between the base (122, 132) and the free end (224, 234) of each of the petals (221, 231) is between 10% and 50% of the thickness (e') of the cheek (120, 130).

10. The claw rotor according to claim 1, wherein the thickness (e) of the base (122, 132) of each of the petals (121, 131) is equal to the thickness (e') of the cheek (120, 130).

11. The claw rotor according to claim 2, wherein the thickness (e) of the base (122, 132) of each of the petals (221, 231) is equal to the thickness (e') of the cheek (120, 130).

12. The claw rotor according to claim 3, wherein the thickness (e) at the base (122, 132) of each of the petals (221, 231) is equal to the thickness (e') of the cheek (120, 130).

13. A claw rotor (202) for an electrical rotary machine, comprising:
   an axis of axial symmetry (X-X);
   two magnet wheels (7, 8) each comprising claws (9) and a flange supporting projections (19) extended by the claws (9) with axial orientation facing towards the flange of the other magnet wheel (8, 7);
   a core interposed between the flanges of the magnet wheels (7, 8); and
   an insulator (211) of an excitation winding (10) fitted on the core;
   the insulator (211) comprising a hub (110) fitted on the core, and a cheek (130, 120) at each of the ends of the hub (110),
   each cheek (120, 130) supporting a plurality of projecting petals (221, 231) which cooperate with the inclined inner periphery of the claw (9),
   each of the petals (221, 231) having a base (122, 132) which is integral with the cheek (120, 130), lateral edges (223, 233) and a free end (224, 234),
   each petal (221, 231) of the claw rotor (202) having a thickness (e) at the lateral edges (223, 233) which increases from the base (122, 132) to the free end (224, 234),
   the thickness (e) of each of the petals (221, 231) increases from the base (122, 132) to the free end (224, 234) at any radial cross-section of the petal (221, 231).

14. The claw rotor according to claim 13, wherein the increase in the thickness (e) is continuous.

15. The claw rotor according to claim 13, wherein the increase in the thickness (e) is progressive.

16. The claw rotor according to claim 2, wherein the thickness (e) of the base (122, 132) of each of the petals (221, 231) is equal to the thickness (e') of the cheek (120, 130).

17. A claw rotor (202) for an electrical rotary machine, comprising:
   an axis of axial symmetry (X-X);
   two magnet wheels (7, 8) each comprising claws (9) and a flange supporting projections (19) extended by the claws (9) with axial orientation facing towards the flange of the other magnet wheel (8, 7);
   a core interposed between the flanges of the magnet wheels (7, 8); and
   an insulator (211) of an excitation winding (10) fitted on the core;
   the insulator (211) comprising a hub (110) fitted on the core, and a cheek (130, 120) at each of the ends of the hub (110),
   each cheek (120, 130) supporting a plurality of projecting petals (221, 231) which cooperate with the inclined inner periphery of the claw (9),
   each of the petals (221, 231) having a base (122, 132) which is integral with the cheek (120, 130), lateral edges (223, 233) and a free end (224, 234),
   each petal (221, 231) of the claw rotor (202) having a thickness (e) at the lateral edges (223, 233) which increases from the base (122, 132) to the free end (224, 234),
   the thickness (e) of each of the petals (221, 231) increases from the base (122, 132) to the free end (224, 234) at any radial cross-section of the petal (221, 231);
   the increase in the thickness (e) between the base (122, 132) and the free end (224, 234) of each of the petals (221, 231) is between 10% and 50% of the thickness (e') of the cheek (120, 130).

* * * * *